(12) United States Patent
Nam

(10) Patent No.: US 8,439,755 B2
(45) Date of Patent: May 14, 2013

(54) GAME CONTROLLER USING KISS

(76) Inventor: Hye Yeon Nam, Atlanta, GA (US)

(*) Notice: Subject to any disclaimer, the term of this patent is extended or adjusted under 35 U.S.C. 154(b) by 0 days.

(21) Appl. No.: 13/331,190

(22) Filed: Dec. 20, 2011

(65) Prior Publication Data

US 2012/0214596 A1  Aug. 23, 2012

Related U.S. Application Data

(60) Provisional application No. 61/445,546, filed on Feb. 23, 2011.

(51) Int. Cl.
*A63F 13/06* (2006.01)
(52) U.S. Cl.
USPC .............. 463/36; 340/4.1; 340/4.11; 702/116
(58) Field of Classification Search .................. 340/4.1, 340/4.11; 341/22; 345/156–157; 463/31, 463/36–37; 600/300; 702/116
See application file for complete search history.

(56) References Cited

U.S. PATENT DOCUMENTS

| | | | | |
|---|---|---|---|---|
| 5,341,133 A | * | 8/1994 | Savoy et al. | 341/22 |
| 6,503,197 B1 | * | 1/2003 | Nemirovski | 600/300 |
| 6,598,006 B1 | * | 7/2003 | Honda et al. | 702/116 |
| 7,071,844 B1 | * | 7/2006 | Moise | 341/21 |
| 7,768,499 B2 | * | 8/2010 | Sturtz | 345/157 |
| 8,044,766 B2 | * | 10/2011 | Ghovanloo et al. | 340/4.11 |
| 2004/0017351 A1 | * | 1/2004 | Bonnat | 345/156 |
| 2007/0270221 A1 | * | 11/2007 | Park et al. | 463/37 |
| 2009/0051564 A1 | * | 2/2009 | Najanguaq Sovso Andreasen Strujik | 340/825.19 |
| 2011/0065504 A1 | * | 3/2011 | Dugan et al. | 463/31 |

* cited by examiner

*Primary Examiner* — Dmitry Suhol
*Assistant Examiner* — Jason Yen
(74) *Attorney, Agent, or Firm* — The PL Law Group, PLLC

(57) ABSTRACT

A game controller includes a magnetic field generation unit to be attached to a tongue of a first user, and a control signal output device to be provided outside a mouth of a second user for outputting a game control signal according to a position of the magnetic field generation unit in the mouth when the tongue of the first user to which the magnetic field generation unit is attached is inserted into the mouth of the second user, wherein the control signal output device measures a magnetic field intensity of the magnetic field generation unit, calculates the position of the magnetic field generation unit in the mouth according to magnetic field intensities measured by the magnetic field sensors, generates a game control signal according to the calculated position, and transmits the generated game control signal to the game apparatus.

19 Claims, 5 Drawing Sheets

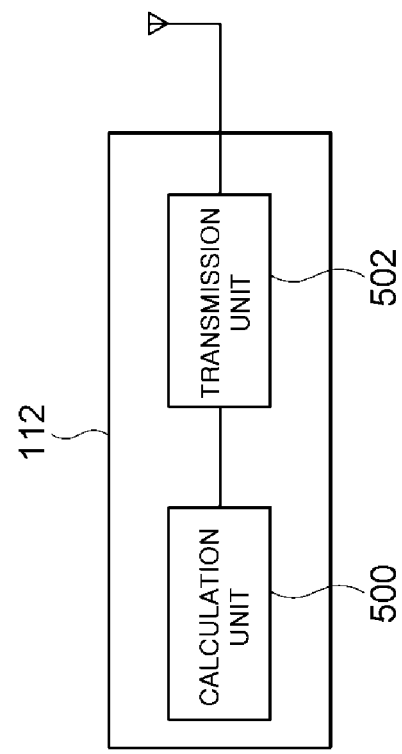

GAME CONTROLLER USING KISS

CLAIM OF PRIORITY

The present application claims the benefit of U.S. provisional patent application No. 61/445,546 filed in the US Patent and Trademark Office on Feb. 23, 2011, the entire contents of which are incorporated herein by reference.

BACKGROUND

1. Field of the Invention

The present invention relates to a controller for video games.

2. Discussion of Related Art

Since video games using a television were first sold in the 1970s, video games have developed into a variety of recreational activities for people all over the world. Initially, arcade games were popular. Recently, however, games of various genres, such as music and sports, have been introduced.

For video games, a controller is used to manipulate various elements in the games. In general, most controllers include direction keys or buttons for direction adjustment, and a plurality of function buttons. However, as games are diversified, new game controllers other than a simple game controller in a button form manipulated by both hands are becoming necessary.

SUMMARY

The present invention is directed to providing a game controller for controlling a game.

According to an exemplary embodiment of the present invention, there is provided a game controller including: a magnetic field generation unit attached to a tongue of a first user; and a control signal output device provided outside a mouth of a second user for outputting a game control signal according to a position in the mouth of the magnetic field generation unit when the tongue of the first user to which the magnetic field generation unit is attached is inserted into the mouth of the second user, wherein the control signal output device includes: a plurality of magnetic field sensors for measuring a magnetic field intensity of the magnetic field generation unit inserted into the mouth of the second user; and a signal processing module for calculating the position in the mouth of the magnetic field generation unit according to magnetic field intensities measured by the plurality of magnetic field sensors, generating a game control signal according to the calculated position, and transmitting the generated game control signal to the game apparatus.

According to the present invention, elements in a game are manipulated using a kiss between two persons, thus generating excitement for the game.

According to an exemplary embodiment of the present invention, there is provided a control signal output device for a game apparatus, the control signal out device including: a magnetic field detecting unit to be put on a second user, the magnetic field detecting unit including: a plurality of magnetic field sensors for measuring magnetic field intensities of a magnetic generating unit inserted into a mouth of the second user at different positions with respect to the mouth of the second user and outputting the measured magnetic field intensities; and a connector connecting the plurality of magnetic field sensors to make the plurality magnetic field sensors to be positioned in the different positions with respect to the mouth of the second user when the magnetic field detecting unit is put on the second user.

According to an exemplary embodiment of the present invention, the control signal output device may further include a signal processing module for receiving the magnetic field intensities output from the plurality of magnetic field sensors and calculating the position of the magnetic field generation unit according to the magnetic field intensities, generating a game control signal according to the calculated position, and transmitting the generated game control signal to the game apparatus.

According to still an exemplary embodiment of the present invention, there is provided a control signal output device for a game apparatus, the control signal out device including: a plurality of magnetic field sensors to be provided outside a mouth of a second user for measuring magnetic field intensities of a magnetic field generation unit positioned on a tongue of a first user when the tongue of the first user on which the magnetic field generation unit is positioned is inserted into the mouth of the second user; and a signal processing module for calculating the position of the magnetic field generation unit in the mouth according to magnetic field intensities measured by the plurality of magnetic field sensors, generating a game control signal according to the calculated position, and transmitting the generated game control signal to the game apparatus.

Further, the present invention may be applied to an input device for various devices, as well as to general video games.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 is a block diagram illustrating a detailed configuration of a signal processing module according to an embodiment of the present invention.

DETAILED DESCRIPTION OF EXEMPLARY EMBODIMENTS

Figure 1:
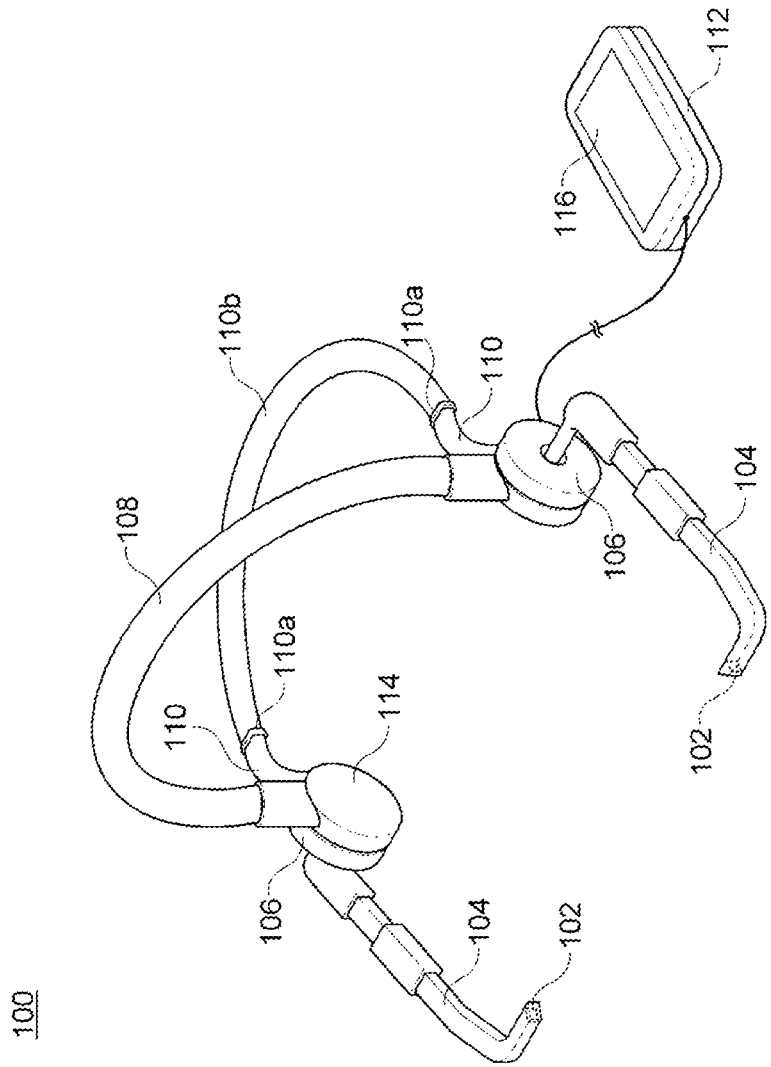
FIG. 1 is a perspective view of a control signal output device according to an embodiment of the present invention.

Exemplary embodiments of the present invention will be described in detail below with reference to the accompanying drawings, and the present invention is not limited thereto.

In the following description, well-known technology related to the present invention is not described in detail in order to keep the disclosure of the invention clear and concise. Terms used herein have been chosen in consideration of functionality of the present invention, and may vary depending on a user's or an operator's intentions, or customs in the art. Therefore, the meanings of terms should be interpreted based on the overall context of the present specification.

These exemplary embodiments are provided so that the present disclosure will be thorough and complete and will fully convey the concept of the invention to those skilled in the art, and the invention will only be defined by the appended claims.

The present invention relates to a game controller using a kiss, and is configured to detect a position of a tongue according to a kiss between a first user and a second user and output a control signal according to the position. According to an embodiment of the present invention, the game controller includes a magnetic field generation unit and a control signal output device.

The magnetic field generation unit is attached to a tongue of the first user, and moved according to a motion of the tongue of the first user when the tongue of the first user is inserted into a mouth of the second user. The magnetic field generation unit may include, for example, a permanent magnet. The permanent magnet may be coated with a metal (e.g., platinum) not reacting with silicon or a human body to minimize stimulation or allergic reaction of the tongue of the first user. The permanent magnet may be attached to the tongue of the first user using, for example, an adhesive for a human body or mouth. In this case, the adhesive preferably has such an adhesion strength that the permanent magnet is not easily detached due to general motions of the tongue or friction with another part in the mouth and also can be easily removed from the tongue, if necessary.

The control signal output device detects the position of the magnetic field generation unit inserted into the mouth of the second user and generates a game control signal. The game control signal may be the same as or similar to, for example, a control signal of a general game control pad including direction keys and function buttons. For example, the control signal output device may generate the same control signal as when a specific direction key or a specific function key is pressed according to the position of the magnetic field generation unit. The control signal may be appropriately set according to an input signal required by a game apparatus connected with the control signal output device. Hereinafter, a detailed configuration of the control signal output device will be described in detail.

According to an embodiment of the present invention, a control signal output device includes a magnetic field detecting unit that includes a plurality of magnetic field sensors and a connector connecting the plurality of magnetic field sensors. When a first user's tongue on which a magnetic generating unit is positioned enters a mouth of a second user, the plurality of magnetic field sensors measure magnetic field intensities at different positions with respect to the mouth of the second user, and output the magnetic field intensities to a signal processing module. The connector connecting the plurality of magnetic field sensors in such a way to make the plurality magnetic field sensors to be positioned in different positions near the second user's mouth to detect the magnetic field intensities which are to be used to calculate the position of the magnetic field generating unit in the mouth. The signal processing module receives the magnetic field intensities output from the plurality of magnetic field sensors and calculates the position of the magnetic field generation unit according to the magnetic field intensities, generates a game control signal according to the calculated position, and transmits the generated game control signal to the game apparatus.

The signal processing module may be included in the control signal output device. Alternatively, the signal processing module may be integrated into the game apparatus.

FIG. 1 is a perspective view of a control signal output device 100 according to an embodiment of the present invention. As shown in FIG. 1, the control signal output device 100 according to an embodiment of the present invention has a form similar to a headset and is mounted to a head of a second user (see FIGS. 2 to 4). The control signal output device 100 includes a plurality of magnetic field sensors 102, a pair of magnetic field sensor guides 104, a pair of guide support portions 106, a headband 108, a pair of earring portions 110, and a signal processing module 112.

The plurality of magnetic field sensors 102 measure intensity of a magnetic field of the magnetic field generation unit inserted into a mouth of a second user. The magnetic field sensor 102 may include, for example, a hole sensor configured so that an amount of internal current is changed with a separation distance between the magnetic field sensor 102 and the magnetic field generation unit.

The magnetic field sensor 102 may be included in a position suitable to sense the magnetic field generated by the magnetic field generation unit. The number and the position of magnetic field sensors 102 may be variously determined according to a feature of a target to be controlled by the controller.

Figure 2:
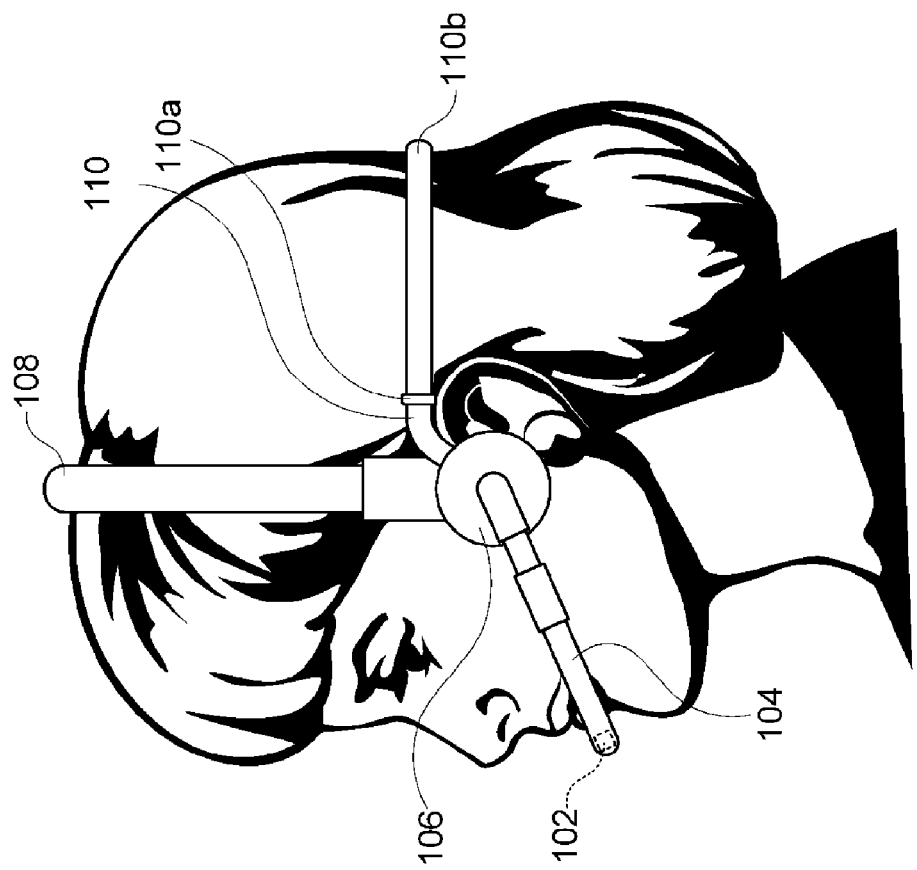
FIGS. 2 to 4 illustrate arrangements of a magnetic field sensor of a control signal output device according to embodiments of the present invention.
Figure 3:
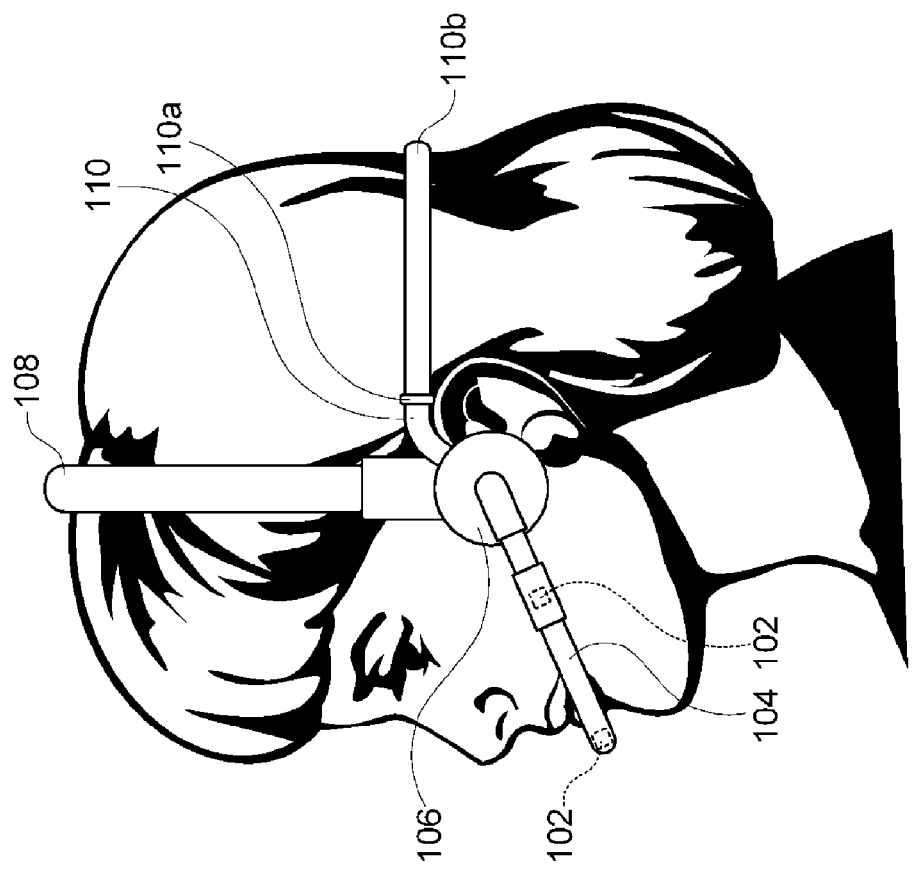
Figure 4:
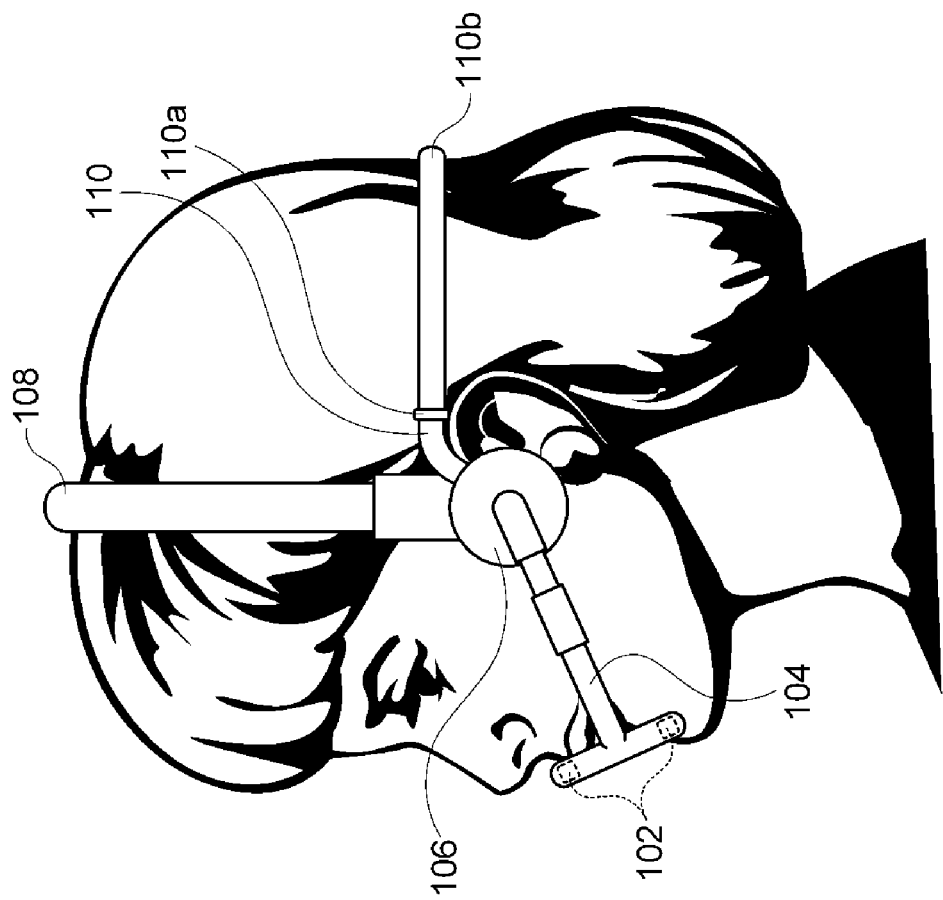

For example, the control signal output device 100 according to an embodiment of the present invention may include two magnetic field sensors 102 as shown in FIG. 2. The two magnetic field sensors 102 may be attached to left and right cheeks of the second user or arranged a predetermined distance away from the left and right cheeks, respectively. Alternatively, as shown in FIG. 3 or 4, the control signal output device 100 may include four magnetic field sensors 102. In this case, the magnetic field sensors 102 may be arranged at a front end of a left cheek, a rear end of the left cheek, a front end of a right cheek, and a rear end of the right cheek of the second user as shown in FIG. 3, or may be arranged at an upper end of the left cheek, a lower end of the left cheek, an upper end of the right cheek, and a lower end of the right cheek of the second user as shown FIG. 4.

The pair of magnetic field sensor guides 104 are for supporting the magnetic field sensors 102 to be fixed to the outside of the mouth (e.g., cheeks) of the second user, and are formed to be inwardly bent according to a facial shape of the second user. Further, each magnetic field sensor guide 104 includes an internal signal line to deliver a sensed signal generated from the magnetic field sensor 102 to the signal processing module 112, which will be described later.

The pair of guide support portions 106 are connected with the pair of magnetic field sensor guides 104. The pair of guide support portions 106 are configured to support the magnetic field sensor guides 104 and adjust positions of the magnetic field sensor guides 104 up or down according to the position of the mouth of the second user, if necessary. As shown FIGS. 2 to 4, the pair of guide support portions 106 are fixed to a front side of both ears of the second user.

The headband 108 connects the pair of guide support portions 106 to each other such that the second user can fix the control signal output device 100 to the head. The headband 108 may be formed of an elastic material (e.g., rubber) so that the second user can easily wear the control signal output device 100 on the head. The headband 108 may further include a length adjustment unit (not shown) having a length adjusted according to a size of the head of the second user, if necessary.

The pair of earring portions 110 fix the control signal output device 100 to both of the ears of the second user such that the control signal output device 100 is stably supported by the head of the second user. The pair of earring portions 110 may further include, at a rear side, a pair of elastic band rings 110a and an elastic band 110b connecting the pair of elastic band rings 110a to each other. As shown in FIGS. 2 to 4, the elastic band 110b is connected with the pair of elastic band rings 110a behind the head of the second user such that the control signal output device 100 is stably supported by the head of the second user.

The signal processing module 112 receives magnetic field intensity signals measured by the respective magnetic field sensors 102 and generates a game control signal from the magnetic field intensity signals. As shown in FIG. 1, the signal processing module 112 may be formed in a separate box form and configured to be connected to, for example, the magnetic field sensor 102 through a cable.

FIG. 5 is a block diagram illustrating a detailed configuration of the signal processing module 112 according to an embodiment of the present invention. As shown in FIG. 5, the signal processing module 112 according to an embodiment of the present invention includes a calculation unit 500 and a transmission unit 502.

The calculation unit 500 calculates a position in the mouth of the magnetic field generation unit according to the magnetic field intensities measured by the plurality of magnetic field sensors 102, and generates a game control signal according to the calculated position.

The calculation unit 500 may compare the magnetic field intensities measured by the plurality of magnetic field sensors 102, and determine a position of the magnetic field sensor 102 measuring the greatest magnetic field intensity to be the position of the magnetic field generation unit. For example, when the two magnetic field sensors 102 are included at the left and right cheeks of the second user, respectively, as shown in FIG. 2, if a sensed value of the magnetic field sensor to the left is greater than a sensed value of the magnetic field sensor to the right, the calculation unit 500 determines that the magnetic field generation unit is present to the left, and otherwise, to the right. Accordingly, the calculation unit 500 may cause a character in the game to move to the left or right or cause the left to be allocated to a function A and the right to a function B, and generate corresponding game control signals. Thus, the calculation unit 500 may generate two different game control signals when the two magnetic field sensors 102 are included as in FIG. 2, and four different game control signals when the four magnetic field sensors 102 are included as in FIGS. 3 and 4.

Alternatively, the calculation unit 500 may calculate the position in the mouth of the magnetic field generation unit according to the magnetic field intensities measured by the plurality of magnetic field sensors 102 and previously stored relative position information of the magnetic field sensors 102. That is, the calculation unit 500 may calculate the position in the mouth of the magnetic field generation unit using triangulation according to the intensity of each magnetic field sensor 102 and the position of each magnetic field sensor 102 and generate a game control signal according to the position.

The transmission unit 502 transmits the game control signal generated by the calculation unit 500 to the game apparatus. For this, the transmission unit 502 may include a wireless or wired communication unit, and may be connected with the game apparatus using the communication unit to transmit the game control signal.

Meanwhile, the control signal output device 100 according to an embodiment of the present invention may further include a pulse sensor 114. The pulse sensor 114 may be formed on an inner surface of the guide support unit 106 contacting the second user as shown in FIG. 1. As shown in FIGS. 2 to 4, the inner surface of the guide support unit 106 is located in the vicinity of an artery at a front side of the ear of the second user when the control signal output device 100 is worn. Thus, when the pulse sensor 114 is arranged on the inner surface of the guide support unit 106, a pulse of the second user can be easily measured. A pulse signal of the second user sensed by the pulse sensor 114 may be transmitted to the calculation unit 500.

When the pulse sensor 114 is included as described above, the calculation unit 500 may generate a game control signal using a pulse rate of the second user measured by the pulse sensor 114 or a change in the pulse rate. For example, the pulse rate of the second user may be increased due to the kiss between the first user and the second user, and the calculation unit 500 may generate a game control signal according to an increase in the pulse rate. For example, a specific function of a game is connected to the pulse sensor 114, and when the change in the pulse rate of the pulse sensor 114 exceeds a previously set value, the specific function may be activated. In addition, the sensed value may be utilized for various functions in the game.

Further, the control signal output device 100 according to an embodiment of the present invention may further include a touch sensor 116. The touch sensor 116 may be attached to a desired part (e.g., back or waist) of a body of the second user or formed in one side of the signal processing module 112 as shown in FIG. 1. An output value of the touch sensor 116 may also be output to the calculation unit 500, similar to the pulse sensor 500.

When the touch sensor 116 is included as described above, the first user or the second user can put pressure on the touch sensor, for example, using the hand (for example, the user can put pressure on the touch sensor 116 formed in the side of the signal processing module 112 in a state in which he or she holds the signal processing module 112 by the hand), and the calculation unit 500 may generate a separate game control signal according to at least one of the pressure put on the touch sensor by the first user and a change in the pressure.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A game controller used as an input unit for a game apparatus, the game controller comprising:
    a magnetic field generation unit to be attached to a tongue of a first user; and
    a control signal output device to be provided outside a mouth of a second user for outputting a game control signal according to a position of the magnetic field generation unit in the mouth of the second user when the tongue of the first user to which the magnetic field generation unit is attached is inserted into the mouth of the second user, the control signal output device comprising:
    a plurality of magnetic field sensors for measuring a magnetic field intensity of the magnetic field generation unit inserted into the mouth of the second user; and
    a signal processing module for calculating the position of the magnetic field generation unit in the mouth of the second user according to magnetic field intensities measured by the plurality of magnetic field sensors, generating a game control signal according to the calculated position, and transmitting the generated game control signal to the game apparatus.

2. The game controller of claim 1, wherein the magnetic field generation unit comprises a permanent magnet coated with a metal not reacting with silicon or a human body.

3. The game controller of claim 1, wherein the plurality of magnetic field sensors comprise:
    a first magnetic field sensor attached to a left cheek of the second user or a predetermined distance away from the left cheek; and a second magnetic field sensor attached to a right cheek of the second user or a predetermined distance away from the right cheek.

4. The game controller of claim 1, wherein the plurality of magnetic field sensors comprise:
- a first magnetic field sensor attached to an upper end of a left cheek of the second user or a predetermined distance away from the upper end of the left cheek;
- a second magnetic field sensor attached to a lower end of the left cheek of the second user or a predetermined distance away from the lower end of the left cheek;
- a third magnetic field sensor attached to an upper end of a right cheek of the second user or a predetermined distance away from the upper end of the right cheek; and
- a fourth magnetic field sensor attached to a lower end of the right cheek of the second user or a predetermined distance away from the lower end of the right cheek.

5. The game controller of claim 1, wherein the plurality of magnetic field sensors comprise:
- a first magnetic field sensor attached to a front end of a left cheek of the second user or a predetermined distance away from the front end of the left cheek;
- a second magnetic field sensor attached to a rear end of the left cheek of the second user or a predetermined distance away from the rear end of the left cheek;
- a third magnetic field sensor attached to a front end of a right cheek of the second user or a predetermined distance away from the front end of the right cheek; and
- a fourth magnetic field sensor attached to a rear end of the right cheek of the second user or a predetermined distance away from the rear end of the right cheek.

6. The game controller of claim 1, wherein the signal processing module calculates the position of the magnetic field generation unit in the mouth according to the magnetic field intensities measured by the plurality of magnetic field sensors and previously stored relative position information of the magnetic field sensors.

7. The game controller of claim 1, wherein the signal processing module compares the magnetic field intensities measured by the plurality of magnetic field sensors and determines a position of the magnetic field sensor measuring the greatest magnetic field intensity to be the position of the magnetic field generation unit.

8. The game controller of claim 1, wherein the control signal output device further comprises:
- a pair of magnetic field sensor guides for fixing the plurality of magnetic field sensors outside the mouth of the second user;
- a pair of guide support portions for supporting the pair of magnetic field sensor guides each at a front side of the ear of the second user;
- a headband for connecting the pair of guide support portions to each other on the head of the second user; and
- a pair of earring portions connected to the pair of guide support portions for fixing the control signal output device to both ears of the second user.

9. The game controller of claim 8, further comprising an elastic band connected to the pair of earring portions along a rear portion of the head of the second user, the elastic band supporting the control signal output device to be fixed to the head of the second user.

10. The game controller of claim 1, wherein the control signal output device further comprises a pulse sensor for measuring a pulse of the second user.

11. The game controller of claim 10, wherein the pulse sensor is formed on an inner surface of at least one of the pair of guide support portions, the inner surface contacting with a front side of at least one of the ears of the second user.

12. The game controller of claim 10, wherein the signal processing module generates a game control signal according to at least one of a pulse rate of the second user measured by the pulse sensor or a change in the pulse rate.

13. The game controller of claim 10, wherein the control signal output device further comprises a touch sensor to be attached to a body of the second user.

14. The game controller of claim 13, wherein the touch sensor is formed on a side surface of the signal processing module.

15. The game controller of claim 10, wherein the signal processing module generates a game control signal according to at least one of pressure put on the touch sensor by the first user or a change in the pressure.

16. A control signal output device for a game apparatus, the control signal out device comprising: a magnetic field detecting unit to be put on a second user, the magnetic field detecting unit comprising: a plurality of magnetic field sensors for measuring magnetic field intensities of a magnetic generating unit inserted into a mouth of the second user at different positions with respect to the mouth of the second user and outputting the measured magnetic field intensities; a connector connecting the plurality of magnetic field sensors to make the plurality magnetic field sensors to be positioned in the different positions with respect to the mouth of the second user when the magnetic field detecting unit is put on the second user; and a signal processing module for receiving the magnetic field intensities output from the plurality of magnetic field sensors and calculating the position of the magnetic field generation unit according to the magnetic field intensities, generating a game control signal according to the calculated position, and transmitting the generated game control signal to the game apparatus.

17. A game controller used as an input unit for the game apparatus, the game controller comprising the control signal output device of claim 16 and a magnetic field generation unit to be positioned on a tongue of a second user.

18. A control signal output device for a game apparatus, the control signal output device comprising:
- a plurality of magnetic field sensors to be provided outside a mouth of a second user for measuring magnetic field intensities of a magnetic field generation unit positioned on a tongue of a first user when the tongue of the first user on which the magnetic field generation unit is positioned is inserted into the mouth of the second user; and
- a signal processing module for calculating the position of the magnetic field generation unit in the mouth according to magnetic field intensities measured by the plurality of magnetic field sensors, generating a game control signal according to the calculated position, and transmitting the generated game control signal to the game apparatus.

19. A game controller used as an input unit for the game apparatus, the game controller comprising the control signal output device of claim 18 and the magnetic field generation unit to be positioned on the tongue of the first user.

* * * * *